US011429124B1

(12) United States Patent
Chou et al.

(10) Patent No.: US 11,429,124 B1
(45) Date of Patent: Aug. 30, 2022

(54) VOLTAGE GENERATION DEVICE AND VOLTAGE GENERATION METHOD

(71) Applicants: Yi-Chung Chou, Taipei (TW); Yu-Chin Chen, Hsinchu (TW); Chih-Yuan Kuo, New Taipei (TW)

(72) Inventors: Yi-Chung Chou, Taipei (TW); Yu-Chin Chen, Hsinchu (TW); Chih-Yuan Kuo, New Taipei (TW)

(73) Assignee: ITE Tech. Inc., Hsinchu (TW)

( * ) Notice: Subject to any disclaimer, the term of this patent is extended or adjusted under 35 U.S.C. 154(b) by 0 days.

(21) Appl. No.: 17/517,690

(22) Filed: Nov. 3, 2021

(30) Foreign Application Priority Data

Aug. 19, 2021 (TW) .................................. 110130675

(51) Int. Cl.
*G05F 1/10* (2006.01)
*G05F 1/44* (2006.01)

(52) U.S. Cl.
CPC ...................................... *G05F 1/44* (2013.01)

(58) Field of Classification Search
CPC ..... G06F 1/10; G06F 1/12; G06F 1/40; G06F 1/42; G06F 1/44; G06F 1/46; G06F 1/468; G06F 1/52; G06F 1/56; G06G 1/54
See application file for complete search history.

(56) References Cited

U.S. PATENT DOCUMENTS 8,179,107 B2 * 5/2012 Fukushi ................ H02M 3/156
  323/284
11,303,218 B2 * 4/2022 Chen ................. H02M 3/33592

* cited by examiner

*Primary Examiner* — Long Nguyen
(74) *Attorney, Agent, or Firm* — JCIPRNET

(57) ABSTRACT

A voltage generation device and a voltage generation method are provided. The voltage generation device includes a first voltage generator, a second voltage generator, a third voltage generator and an output voltage generator. The first to third voltage generators respectively generate first to third voltages. The output voltage generator generates an output voltage at an output end according to the first voltage, the second voltage and the third voltage. When the output voltage is converted between the first voltage and the second voltage, during a first time period, the first voltage generator provides the first voltage to a first capacitor, and the third voltage generator causes the output voltage to change from the second voltage to the third voltage. During a second time period, the first voltage generator and the first capacitor cause the output voltage to change from the third voltage to the first voltage.

13 Claims, 6 Drawing Sheets

VOLTAGE GENERATION DEVICE AND VOLTAGE GENERATION METHOD

CROSS-REFERENCE TO RELATED APPLICATION

This application claims the priority benefit of Taiwan application no. 110130675, filed on Aug. 19, 2021. The entirety of the above-mentioned patent application is hereby incorporated by reference herein and made a part of this specification.

BACKGROUND

Technical Field

The disclosure relates to a voltage generation device and a voltage generation method, and in particular, to a voltage generation device and a voltage generation method capable of reducing an inrush current.

Description of Related Art

In a voltage generation device, when an output voltage greatly changes, a strong instant inrush current may occur due to limitations on the external capacitive load and switch time. The occurrence of such inrush current is likely to cause certain damage on the voltage generation device and the entire system due to a current surge, and the service life is thus reduced.

SUMMARY

The disclosure is directed to a voltage generation device and a voltage generation method capable of reducing an inrush current.

The voltage generation device of the disclosure includes a first voltage generator, a second voltage generator, a third voltage generator, and an output voltage generator. The first voltage generator to the third voltage generator respectively generate a first voltage to a third voltage. The first voltage and the second voltage are different, and the third voltage is between the first voltage and the second voltage. The output voltage generator generates an output voltage at an output end according to the first voltage, the second voltage, and the third voltage. When the output voltage is converted between the first voltage and the second voltage, during a first time period, the first voltage generator provides the first voltage to a first capacitor. The third voltage generator causes the output voltage to change from the second voltage to the third voltage. During a second time period, the first voltage generator and the first capacitor cause the output voltage to change from the third voltage to the first voltage.

The voltage generation method of the disclosure includes the following. A first voltage generator is provided to generate a first voltage. A second voltage generator is provided to generate a second voltage. The first voltage and the second voltage are different. A third voltage generator is provided to provide a third voltage. The third voltage is between the first voltage and the second voltage. An output voltage generator is provided to generate an output voltage at an output end according to the first voltage, the second voltage, and the third voltage. When the output voltage is converted between the first voltage and the second voltage, during a first time period, the first voltage generator is caused to provide the first voltage to a first capacitor. The third voltage generator is provided to cause the output voltage to change from the second voltage to the third voltage. During a second time period, the first voltage generator and the first capacitor are provided to cause the output voltage to change from the third voltage to the first voltage.

Based on the above, in the voltage generation device of the disclosure, the first voltage generator provides or pumps a current of the corresponding first capacitor in advance during the first time period when the output voltage is converted, and, at the same time, the output voltage is adjusted to the third voltage with an intermediate value. Next, during the second time period, the output voltage is adjusted to a target voltage value according to the first voltage generator and the corresponding first capacitor at the same time. In this way, the inrush current generated in voltage adjustment may be effectively reduced, and the potential disturbance and damage may be reduced.

DESCRIPTION OF THE EMBODIMENTS

Figure 1:
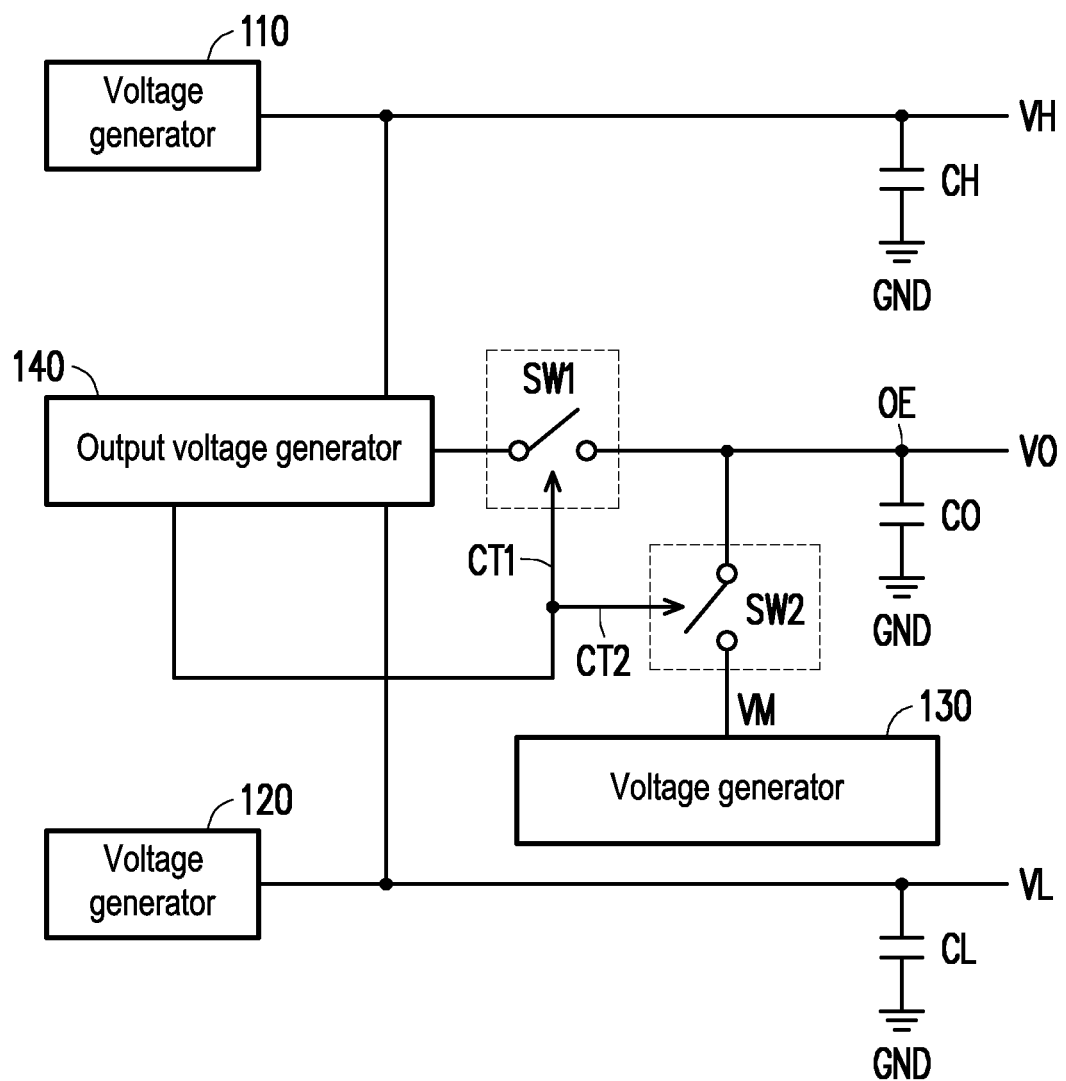
FIG. 1 is a schematic diagram of a voltage generation device according to an embodiment of the disclosure.

Referring to FIG. 1, FIG. 1 is a schematic diagram of a voltage generation device according to an embodiment of the disclosure. A voltage generation device 100 includes voltage generators 110 to 130, an output voltage generator 140, switches SW1 and SW2, and capacitors CH, CL, and CO. The voltage generator 110 is configured to generate a voltage VH, and the voltage generator 120 is configured to generate a voltage VL. The output voltage generator 140 is coupled to the voltage generator 110 and the voltage generator 120 and receives the voltage VH and the voltage VL respectively generated by the voltage generator 110 and the voltage generator 120. A voltage value of the voltage VH and a voltage value of the voltage VL are different. The output voltage generator 140 generates an output voltage VO at an output end OE of the voltage generation device 100 according to the voltage VH and the voltage VL.

In addition, the voltage generator 130 is coupled to the output end OE and is configured to generate a voltage VM. A voltage value of the voltage VM is between the voltage value of the voltage VH and the voltage value of the voltage VL.

In the embodiment, the switch SW1 is coupled between the output voltage generator 140 and the output end OE. The switch SW2 is coupled between the voltage generator 130 and the output end OE. The switch SW1 may be turned on or off according to a control signal CT1. The switch SW2 may be turned on or off according to a control signal CT2. The control signal CT1 and the control signal CT2 may be provided by the output voltage generator 140. Furthermore, the switch SW1 and the switch SW2 are not turned on at the same time.

In addition, the capacitor CH is coupled between an end of the voltage generator 110 where the voltage VH is generated and a reference grounding end GND. The capacitor CL is coupled between an end of the voltage generator 120 where the voltage VL is generated and the reference grounding end GND. The capacitor CO is coupled between the output end OE and the reference grounding end GND. For example, the voltage VH is greater than the voltage VL. When the voltage generator 110 generates the voltage VH, the capacitor CH may receive the voltage VH and perform charging. When the voltage generator 120 generates the voltage VL, the capacitor CL may receive the voltage VL and perform charging or discharging. The capacitor CO may serve as a voltage stabilizing capacitor of the output voltage VO.

In the embodiment, the voltage value of the voltage VH may be higher than the voltage value of the voltage VM, and the voltage value of the voltage VM is higher than the voltage value of the voltage VL.

In detail, for example, the output voltage VO is initially equal to the voltage VL. When the output voltage VO is converted, during a first time period, the switch SW1 is turned off and the switch SW2 is turned on. At the same time, the voltage generator 110 may provide the voltage VH to the capacitor CH and cause the capacitor CH to perform charging. The voltage generator 130 generates the voltage VM at the same time and causes the output voltage VO to change from the voltage VL to the voltage VM through the switch SW2. Next, during a second time period after the first time period, the switch SW1 is turned on and the switch SW2 is turned off. The voltage generator 110 and the capacitor CH may provide a current to cause the output voltage VO to change from the voltage VM to the voltage VH through the switch SW2.

In addition, for example, the output voltage VO is initially equal to the voltage VH. When the output voltage VO is converted, during the first time period, the switch SW1 is turned off and the switch SW2 is turned on. At the same time, the voltage generator 120 may provide the voltage VL to the capacitor CL and pump a current from the capacitor CL. The voltage generator 130 generates the voltage VM at the same time and causes the output voltage VO to change from the voltage VH to the voltage VM through the switch SW2. Next, during the second time period after the first time period, the switch SW1 is turned on and the switch SW2 is turned off. The voltage generator 120 and the capacitor CL may pump a current from the capacitor CO through the switch SW2 to cause the output voltage VO to change from the voltage VM to the voltage VL.

Based on the description above, in the voltage generation device 100 of the embodiment of the disclosure, when the voltage value of the generated output voltage VO changes, the output voltage VO may be first adjusted to the voltage VM with the intermediate voltage value and then be adjusted to the target voltage VH or the target voltage VL. Furthermore, the voltage generation device 100 of the embodiment of the disclosure may perform charging or discharging in advance according to the capacitor CH or the capacitor CL to assist an adjustment of the output voltage VO performed by the voltage generation device 100 during the second time period. Hence, a current value of a generated inrush current may be effectively reduced.

Figure 2A:
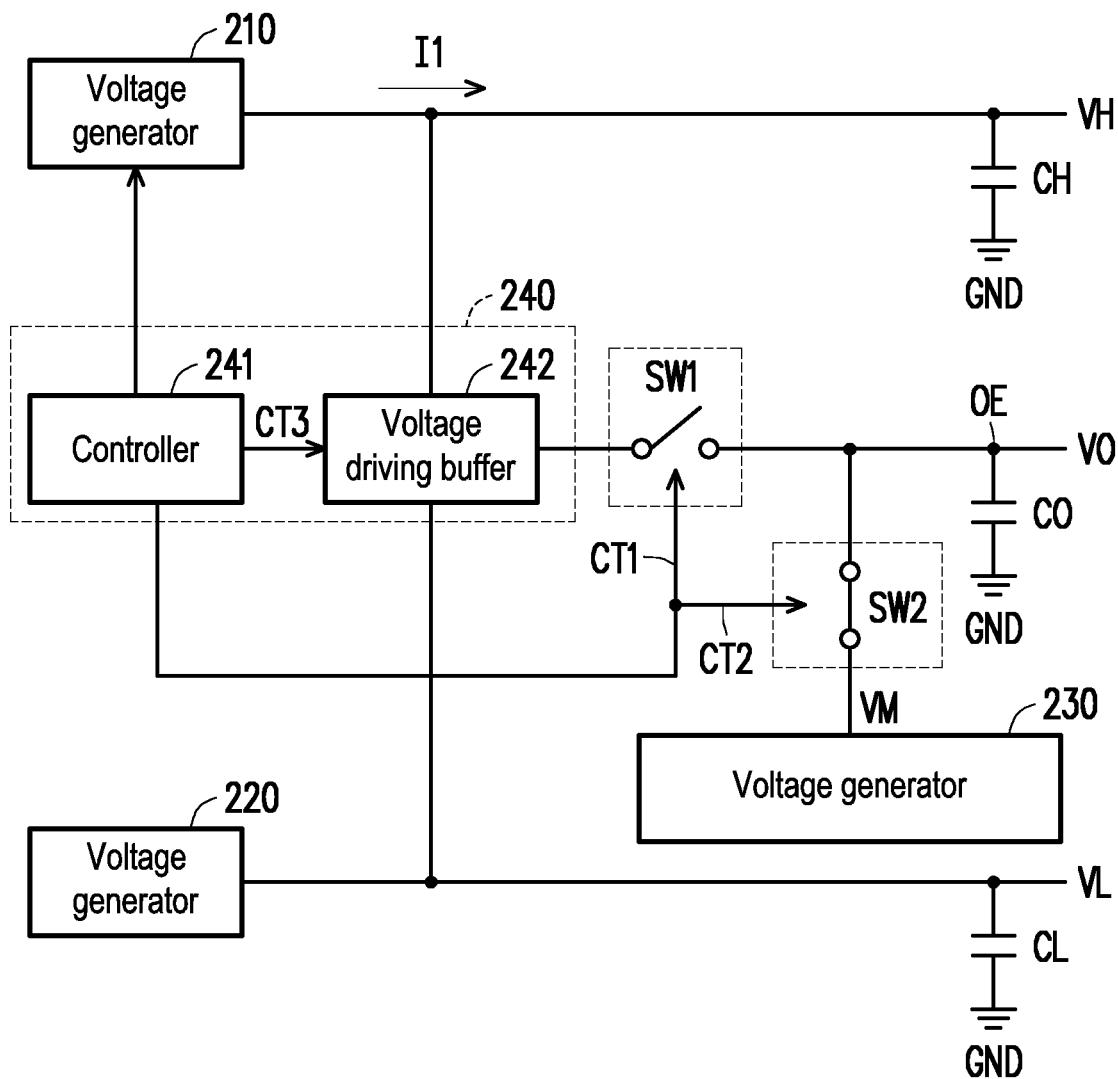
FIG. 2A and FIG. 2B are schematic diagrams of a voltage generation device and an action thereof according to another embodiment of the disclosure.
Figure 2B:
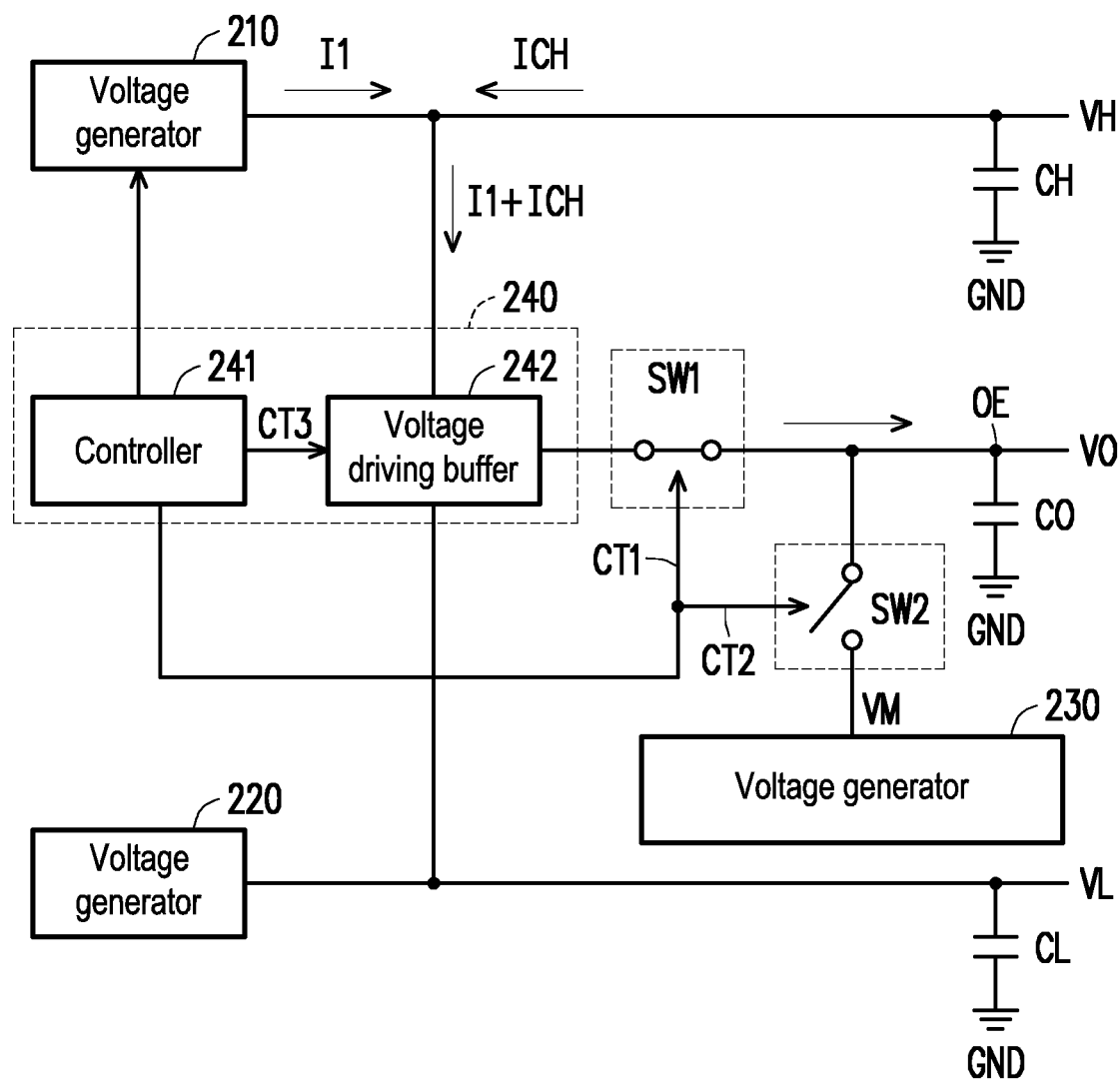
Figure 3:
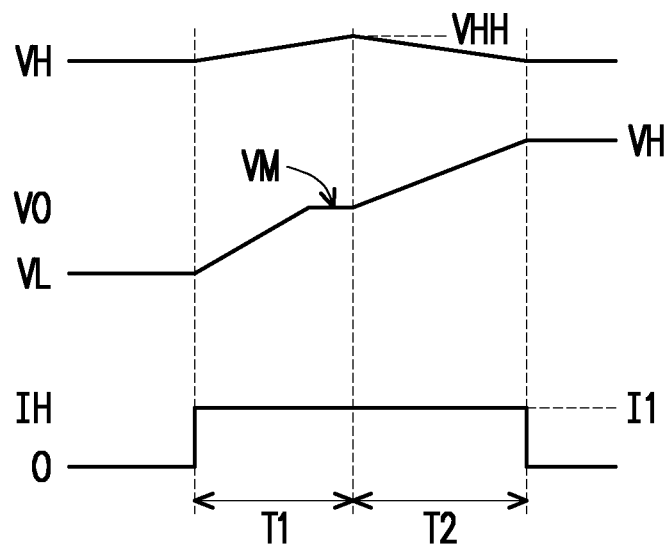
FIG. 3 is a waveform diagram of an action of a voltage generation device according to an embodiment of the disclosure.

Below referring to FIG. 2A, FIG. 2B, and FIG. 3, FIG. 2A and FIG. 2B are schematic diagrams of a voltage generation device and an action thereof according to another embodiment of the disclosure. FIG. 3 is a waveform diagram of an action of a voltage generation device according to an embodiment of the disclosure. In FIG. 2A, a voltage generation device 200 includes voltage generators 210 to 230, an output voltage generator 240, the switches SW1 and SW2, and the capacitors CH, CL, and CO. In the embodiment, the output voltage generator 240 includes a controller 241 and a voltage driving buffer 242. The controller 241 and the voltage driving buffer 242 are coupled to each other. The voltage driving buffer 242 may, according to a control signal CT3, generate the output voltage VO at the output end OE according to the voltage VH or the voltage VL. The controller 241 is configured to generate control signals CT1 to CT3. The control signal CT1 and the control signal CT2 respectively control the switches SW1 and SW2 to be turned on or off.

In the embodiment, the controller 241 may be implemented by using any form of a digital circuit and generate the control signals CT1 to CT3 according to a voltage switch instruction. The voltage switch instruction may be provided by an external electronic device.

In detail, when the output voltage VO has to change from the voltage VL that is relatively low to the voltage VH that is relatively high, referring to FIG. 2A and FIG. 3 together, during a first time period T1, the controller 241 generates the control signal CT1 and the control signal CT2 to cause the switch SW1 to be turned off and cause the switch SW2 to be turned on. At the same time, the controller 241 causes the voltage driving buffer 242 to be non-active through the control signal CT3 to save power. At the same time, during the first time period T1, the voltage generator 230 is activated and provides the voltage VM to the output end OE to boost the output voltage VO from the voltage VL to the voltage VM. The output voltage VO may be equal to the voltage VM for a maintenance time period.

In addition, during the first time period T1, the voltage generator 210 is activated and provides a current IH equal to a current value I1 to charge the capacitor CH. Based on charging the capacitor CH, the voltage value of the voltage VH generated by the voltage generator 210 may be linearly increased to a voltage value VHH.

After the first time period T1, the process enters a second time period T2. Referring to FIG. 2B and FIG. 3 together, during the second time period T2, the controller 241 generates the control signal CT1 and the control signal CT2 to cause the switch SW1 to be turned on and cause the switch SW2 to be turned off. At the same time, the controller 241 causes the voltage driving buffer 242 to be activated through the control signal CT3. At this time, the voltage generator 210 and the capacitor CH may respectively provide the current IH equal to the current value I1 and a current ICH to the voltage driving buffer 242. The voltage driving buffer 242 causes the current IH and the current ICH to be transmitted to the capacitor CO to charge the capacitor CO to generate the output voltage VO.

Note that in the embodiment, during the first time period T1, a voltage on the capacitor CH may linearly increase. During the second time period T2, the voltage on the capacitor CH may linearly decrease. In addition, during both of the first time period T1 and the second time period T2, the current IH provided by the voltage generator 210 may be maintained equal to the current value I1. The relation between the current value I1 and the voltage value VHH, the voltage VH, the capacitor CH, and the first time period T1 is: $I1=CH*(VHH-VH)/T1$. The relation between the current value I1 and the voltage value VHH, the voltage VM, the voltage VH, the capacitor CO, and the second time period T2 is: $I1=[CO*(VH-VM)-CH*(VHH-VH)]/T2$. The relation between the current value I1 and a total time T (=the first time period T1+the second time period T2) may be: $I1=CO*(VH-VM)/T$.

In the embodiment of the disclosure, the voltage generator 210 may continue providing the current IH during the first time period T1 and the second time period T2 to serve as a basis to boost the output voltage VO. In this way, the voltage generator 210 may lower the current value I1 of the current IH that is required to be provided. Hence, the inrush current may be effectively reduced.

Figure 4:
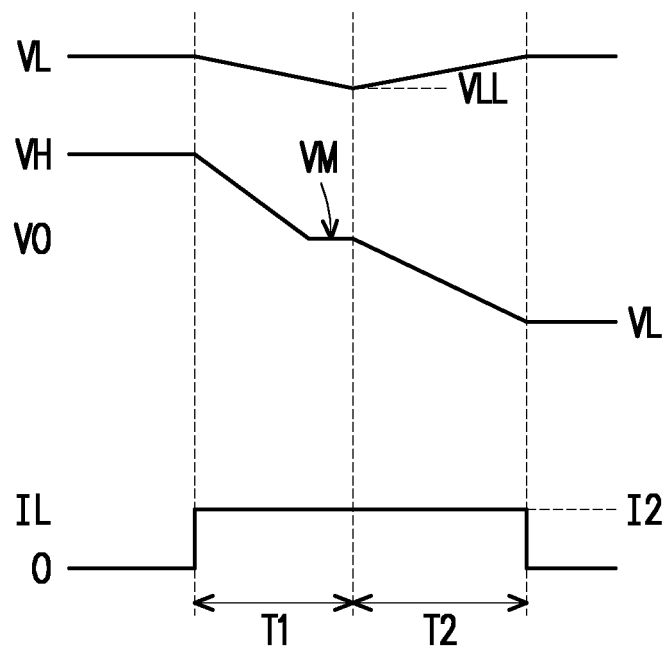
FIG. 4 is a waveform diagram of an action of another implementation of a voltage generation device according to another embodiment of the disclosure.

Referring to FIG. 4, FIG. 4 is a waveform diagram of an action of another implementation of a voltage generation device according to another embodiment of the disclosure. In FIG. 4, the output voltage VO generated by the voltage generation device 200 decreases from the voltage VH that is relatively high to the voltage VL that is relatively low. During the time period T1, the switch SW1 is turned off and the switch SW2 is turned on. The voltage generator 220 may pump a current IL with a current value I2 for the capacitor CL, and, at the same time, the voltage generator 230 provides the voltage VM to cause the output voltage VO to be lowered from the voltage VH to the voltage VM. Based on the voltage generator 220 pumping the current, the voltage VL on the capacitor CL may linearly decrease to a voltage value VLL.

Next, during the time period T2, the switch SW1 is turned on and the switch SW2 is turned off. The voltage generator 220 and the capacitor CL may respectively pump a current from the output end OE and cause the output voltage VO to decrease from the voltage VM to the voltage VL. Based on the capacitor CL pumping the current, the voltage VL on the capacitor CL may linearly increase. The relation between the current value I2 and the voltage value VLL, the voltage VL, the capacitor CL, and the first time period T1 is: $I2=CL*(VL-VLL)/T1$. The relation between the current value I2 and the voltage value VLL, the voltage VM, the voltage VL, the capacitor CO, and the second time period T2 is: $I2=[CO*(VM-VL)-CL*(VL-VLL)]/T2$. The relation between the current value I2 and the total time T (=the first time period T1+the second time period T2) may be: $I2=CO*(VM-VL)/T$.

In the same way, in the embodiment of the disclosure, the voltage generator 220 may continue pumping the current IL during the first time period T1 and the second time period T2 to serve as a basis to lower the output voltage VO. In this way, the voltage generator 220 may lower the current value I2 of the current IL that is required to be provided. Hence, the inrush current may be effectively reduced.

Figure 5:
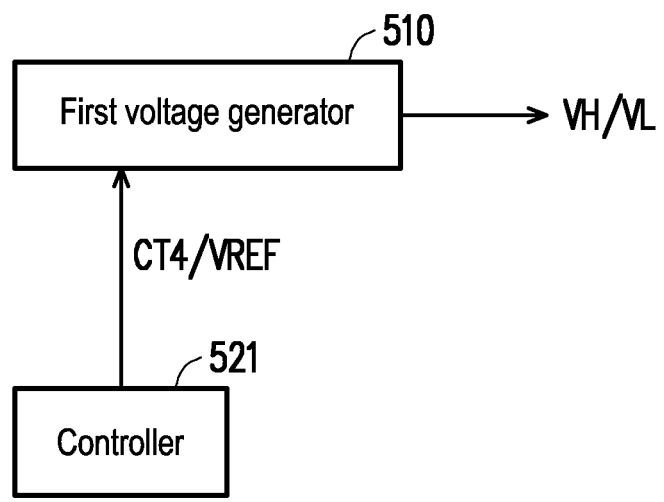
FIG. 5 is a schematic diagram of an implementation of a first voltage generator in a voltage generation device according to an embodiment of the disclosure.

Below referring to FIG. 5, FIG. 5 is a schematic diagram of an implementation of a first voltage generator in a voltage generation device according to an embodiment of the disclosure. In the embodiment of the disclosure, a first voltage generator 510 (as the voltage generator 110 or the voltage generator 120 in the embodiment of FIG. 2A) in the voltage generation device may be coupled to a controller 521 (as the controller 241 in the embodiment of FIG. 2A). In an implementation, the controller 521 may provide a reference voltage VREF to the first voltage generator 510. The first voltage generator 510 may generate the corresponding voltage VH or the corresponding voltage VL according to the reference voltage VREF. Corresponding to the implementation of FIG. 3, the reference voltage VREF may be a voltage linearly increasing during the first time period T1 and a voltage linearly decreasing during the time period T2. The first voltage generator 510 may generate the voltage VH. Corresponding to the implementation of FIG. 4, the reference voltage VREF may be a voltage linearly decreasing during the first time period T1 and a voltage linearly increasing during the time period T2. The first voltage generator 510 may generate the voltage VL.

In another implementation, the controller 521 may generate a control signal CT4. Corresponding to the implementation of FIG. 3, the first voltage generator 510 may be operated in a constant voltage output mode during the first time period T1 and operated in a constant current output mode during the second time period T2 according to the control signal CT4.

Figure 6:
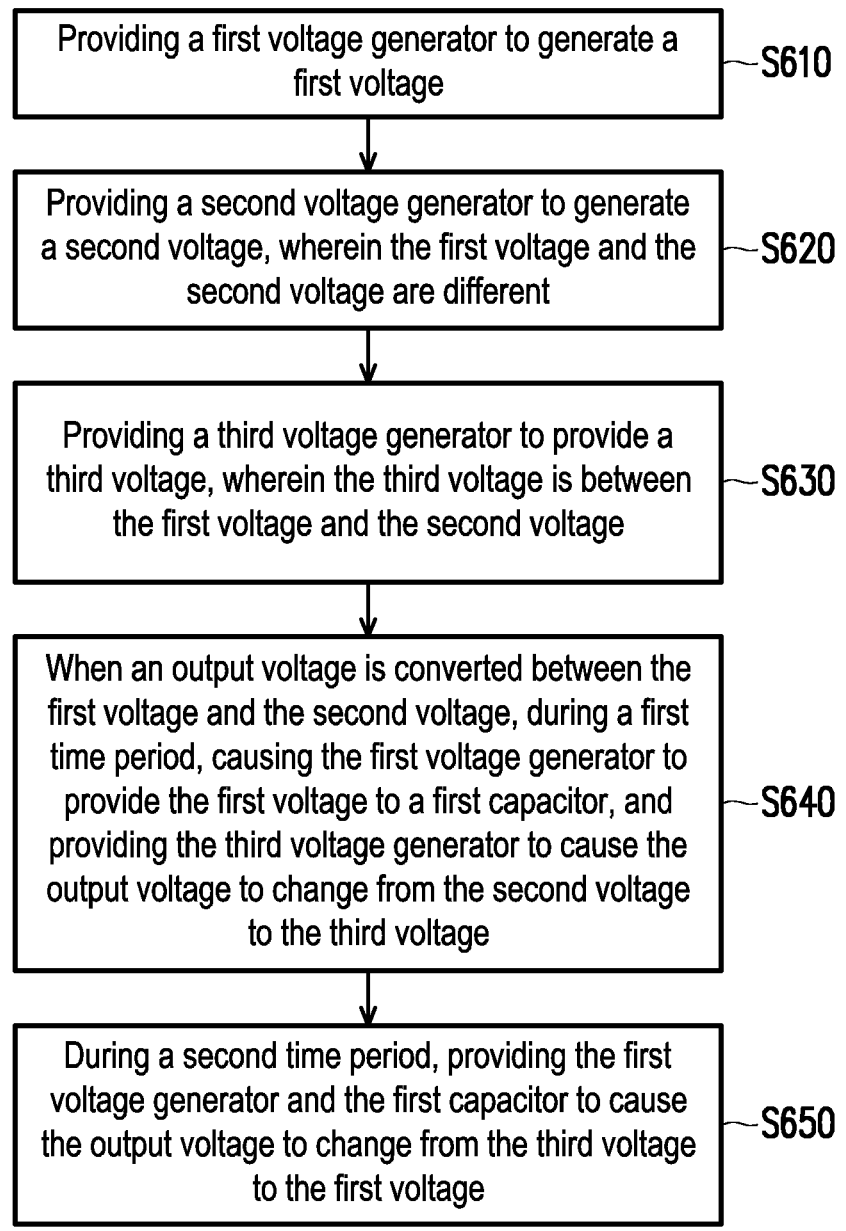
FIG. 6 is a flow chart of a voltage generation method according to an embodiment of the disclosure.

Below referring to FIG. 6, FIG. 6 is a flow chart of a voltage generation method according to an embodiment of the disclosure. In step S610, a first voltage generator is provided to generate a first voltage. In step S620, a second voltage generator is provided to generate a second voltage. The first voltage and the second voltage are different. In step S630, a third voltage generator is provided to provide a third voltage. The third voltage is between the first voltage and the second voltage, and an output voltage generator is provided to generate an output voltage at an output end according to the first voltage, the second voltage, and the third voltage. Next, in step S640, when the output voltage is converted between the first voltage and the second voltage, during a first time period, the first voltage generator is caused to provide the first voltage to a first capacitor. The third voltage generator is provided to cause the output voltage to change from the second voltage to the third voltage. In step S650, during a second time period, the first voltage generator and the first capacitor are provided to cause the output voltage to change from the third voltage to the first voltage.

Regarding the details of the implementation of the steps above, they are described in detail in the multiple aforementioned embodiments and implementations and are not repeated below.

In summary of the above, in the voltage generation device of the disclosure, when the output voltage is converted, during the first time period, the first voltage generator provides or pumps the current of the corresponding first capacitor in advance, and the output voltage is adjusted to the third voltage with the intermediate value at the same time. Next, during the second time period, the output voltage is increased or decreased to a target voltage value according to the first voltage generator and the corresponding first capacitor at the same time. In this way, the inrush current generated in voltage adjustment may be effectively reduced, and the potential disturbance and damage may be reduced.

What is claimed is:

1. A voltage generation device, comprising:
   a first voltage generator configured to generate a first voltage;
   a second voltage generator configured to generate a second voltage, wherein the first voltage and the second voltage are different;
   a third voltage generator providing a third voltage, wherein the third voltage is between the first voltage and the second voltage; and
   an output voltage generator receiving the first voltage and the second voltage and generating an output voltage at an output end according to the first voltage, the second voltage, and the third voltage,
   wherein, in response to the output voltage being converted between the first voltage and the second voltage, during a first time period, the first voltage generator provides the first voltage to a first capacitor, the third voltage generator causes the output voltage to change from the second voltage to the third voltage, and during a second time period, the first voltage generator and the first capacitor cause the output voltage to change from the third voltage to the first voltage.

2. The voltage generation device according to claim 1, further comprising:
a first switch coupled between the output voltage generator and the output end; and
a second switch coupled between the third voltage generator and the output end,
wherein the first switch is turned on or off according to a first control signal, the second switch is turned on or off according to a second control signal, and the first switch and the second switch are not turned on at the same time.

3. The voltage generation device according to claim 2, wherein the output voltage generator comprises:
a controller configured to generate the first control signal, the second control signal, and a third control signal; and
a voltage driving buffer coupled to the controller and, according to the third control signal, generating the output voltage at the output end according to the first voltage or the second voltage.

4. The voltage generation device according to claim 2, further comprising:
a second capacitor coupled to the first voltage generator and receiving the second voltage; and
a third capacitor coupled to the output end.

5. The voltage generation device according to claim 4, wherein, in response to the first voltage being greater than the second voltage,
wherein, during the first time period:
the first switch is turned off, the second switch is turned on, the first voltage generator provides a first current to charge the first capacitor, and the second voltage generator provides the third voltage to the third capacitor to cause the output voltage to change from the second voltage to the third voltage,
wherein, during the second time period after the first time period:
the first switch is turned on, the second switch is turned off, and the first voltage generator and the first capacitor respectively provide a second current and a third current to the third capacitor to boost the output voltage from the third voltage to the first voltage.

6. The voltage generation device according to claim 5, wherein during the first time period, a voltage on the first capacitor linearly increases, and during the second time period, the voltage on the first capacitor linearly decreases.

7. The voltage generation device according to claim 6, wherein the first voltage generator generates the first voltage according to a reference voltage, the reference voltage linearly increases during the first time period, and the reference voltage linearly decreases during the second time period.

8. The voltage generation device according to claim 5, wherein the first voltage generator is operated in a constant voltage output mode during the first time period and is operated in a constant current output mode during the second time period.

9. The voltage generation device according to claim 4, wherein in response to the first voltage being less than the second voltage,
wherein, during the first time period:
the first switch is turned off, the second switch is turned on, the first voltage generator charges the first capacitor and pumps a first current, and the second voltage generator provides the third voltage to the third capacitor to cause the output voltage to change from the second voltage to the third voltage,
wherein, during the second time period after the first time period:
the first switch is turned on, the second switch is turned off, the first voltage generator and the first capacitor respectively pump a second current and a third current from the third capacitor to lower the output voltage from the third voltage to the first voltage.

10. A voltage generation method, comprising:
providing a first voltage generator to generate a first voltage;
providing a second voltage generator to generate a second voltage, wherein the first voltage and the second voltage are different;
providing a third voltage generator to provide a third voltage, wherein the third voltage is between the first voltage and the second voltage;
providing an output voltage generator to generate an output voltage at an output end according to the first voltage, the second voltage, and the third voltage;
in response to the output voltage being converted between the first voltage and the second voltage, during a first time period, causing the first voltage generator to provide the first voltage to a first capacitor, and providing the third voltage generator to cause the output voltage to change from the second voltage to the third voltage; and
during a second time period, providing the first voltage generator and the first capacitor to cause the output voltage to change from the third voltage to the first voltage.

11. The voltage generation method according to claim 10, further comprising:
in response to the first voltage being greater than the second voltage, during the first time period, causing a voltage on the first capacitor to linearly increase, and during the second time period, causing the voltage on the first capacitor to linearly decrease.

12. The voltage generation method according to claim 11, further comprising:
causing the first voltage generator to generate the first voltage according to a reference voltage; and
causing the reference voltage to linearly increase during the first time period, and causing the reference voltage to linearly decrease during the second time period.

13. The voltage generation method according to claim 10, further comprising:
causing the first voltage generator to be operated in a constant voltage output mode during the first time period and causing the first voltage generator to be operated in a constant current output mode during the second time period.

* * * * *